G. L. HORTON.
DIRIGIBLE HEADLIGHT.
APPLICATION FILED APR. 20, 1921.
1,428,436.
Patented Sept. 5, 1922.
2 SHEETS—SHEET 1.
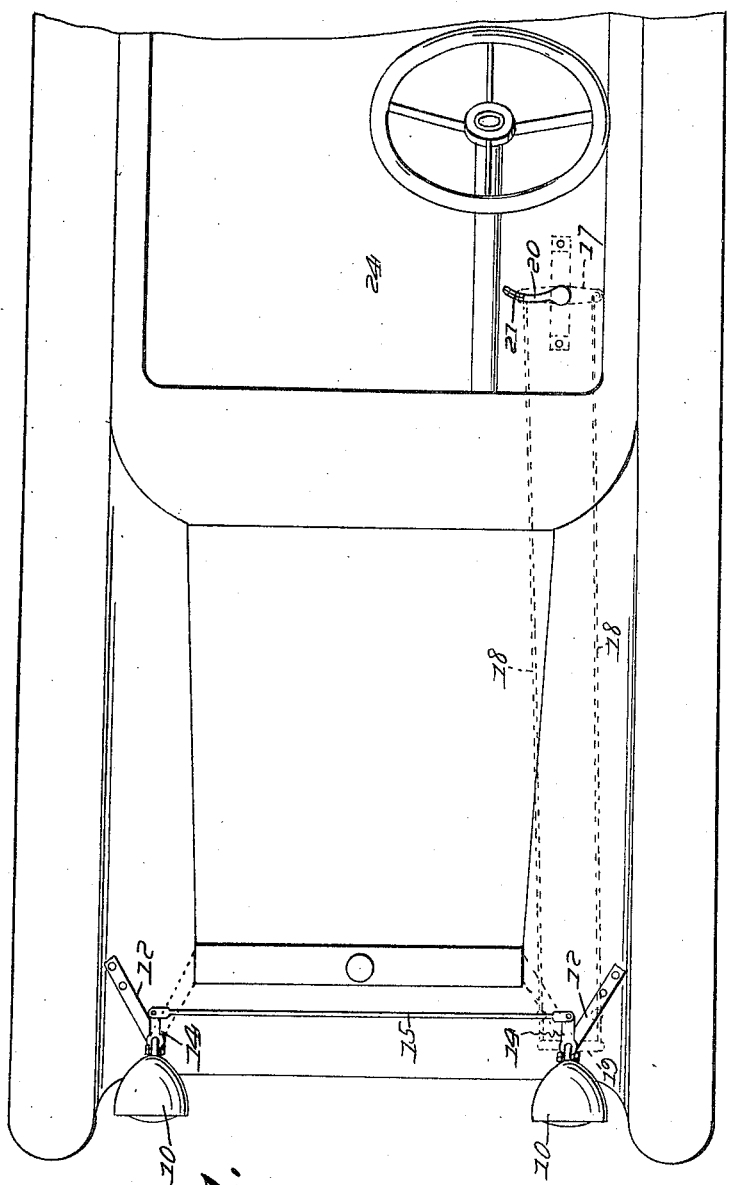
Inventor
George L. Horton,
By
Attorney

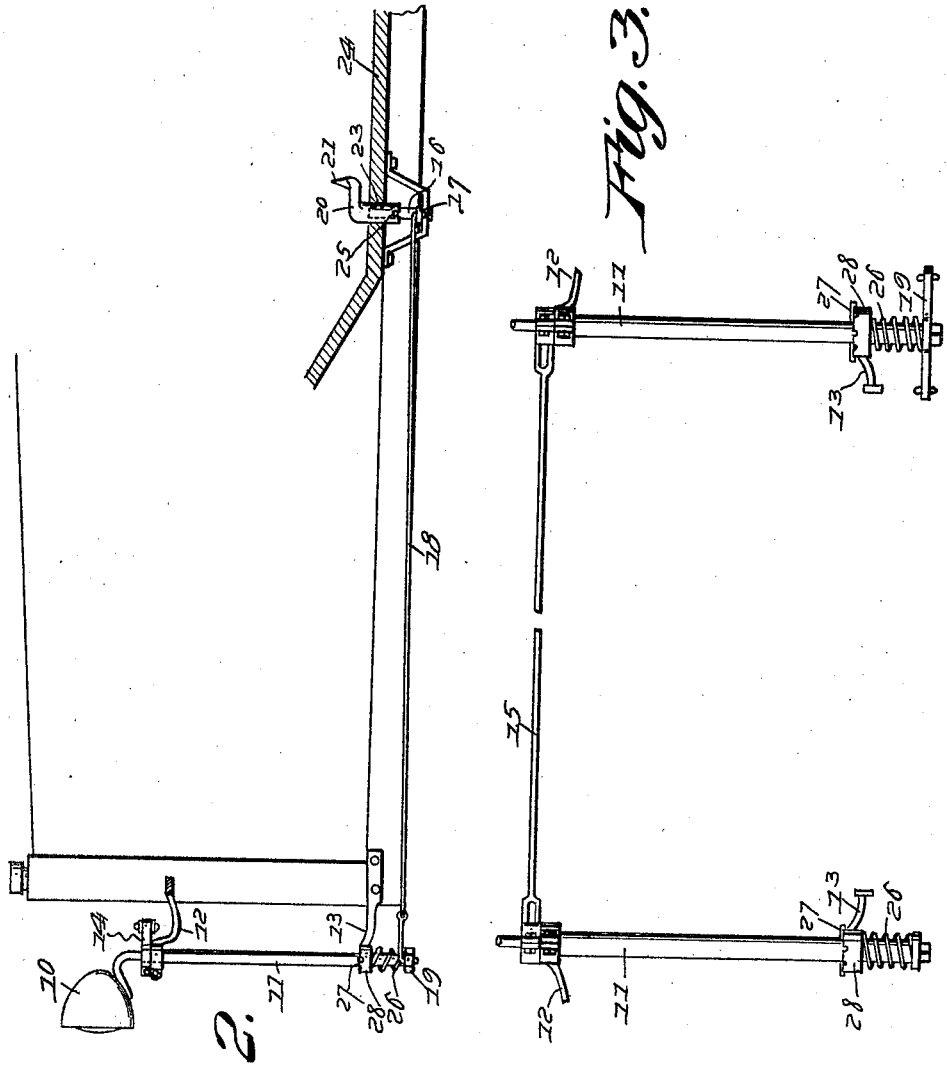

Patented Sept. 5, 1922.

1,428,436

UNITED STATES PATENT OFFICE.

GEORGE L. HORTON, OF CASEVILLE, MICHIGAN.

DIRIGIBLE HEADLIGHT.

Application filed April 20, 1921. Serial No. 462,951.

*To all whom it may concern:*

Be it known that GEORGE L. HORTON, a citizen of the United States of America, residing at Caseville, in the county of Huron and State of Michigan, has invented new and useful Improvements in Dirigible Headlights, of which the following is a specification.

The object of the invention is to provide a dirigible headlight which is readily controllable in position to effect the desired direction of the rays of light from the lamp or lamps employed as headlights, to adapt them to perform the functions or dispense with the auxiliary use of a spot light and dimmer mechanism.

It is, therefore, the purpose of the present invention to provide a dirigible light mechanism whereby the deflection or movement of the headlights from the direct path of the car may be effected manually or by foot pressure, primarily to enable the driver to ascertain the available width of the driving surface of the roadway or to pick out objects at a distance from the road side as in locating land marks, in substantially the same manner as the spot light is now used without necessitating the use of an independent spot light; and furthermore to provide by the same means and in the same connection for turning the headlights for directing the light opposite to that of an approaching vehicle moving in the opposite direction, so as not only to avoid the inconvenience incident to the glare of the light in the eyes of the approaching driver but to lie upon and clearly define the side of the road which must be followed by the operator of the vehicle having the lights, to enable him to avoid accidents by running into a side ditch or the like, and thus to adapt the ordinary head lights to perform the functions usually requiring the use of dimming means or requiring the extinguishment of the headlights.

With these objects in view the invention consists in the construction and combination of parts of which a preferred embodiment is shown in the accompanying drawing, wherein:

Figure 1 is a plan view of a dirigible light mechanism embodying the invention applied in the operative position to a vehicle.

Figure 2 is a side view of the same.

Figure 3 is a front view partly in section.

Figure 4 is a detail perspective view showing the notched collar by which the lamp is retained in the position to which it is turned.

Figure 5 is a detail view partly in elevation and partly in section showing the foot actuated crank arm.

The apparatus embodies essentially headlight casings or lamps 10 having spindles 11 mounted revolubly in suitable upper and lower brackets 12 and 13 and carrying crank arms 14 connected by a transverse rod 15 and an operating spindle 16 having a cross head 17 of which the arms are respectively connected by rods 18 with a cross head 19 on one of the lamp spindles, so that a turning movement of the operating spindle 16 serves to revolve the lamp spindles in one direction or the other at the option of the driver of the car. A foot pedal 20 is engaged with the operating spindle 16 within convenient reach of the driver and has a rearwardly or forwardly extending crank arm terminating in a toe clip or ear 21 so that merely by a slight lateral movement of the foot the parts may be adjusted to correspondingly vary the direction of projection of the rays of light from the lamps. The pedal 20 is preferably detachably mounted upon the operating spindle, having a socket portion 22 extending downward through a suitable opening 23 in the floor 24 of the car and notched at its extremity for engagement with a lateral pin 25, so that the foot operating means may be disconnected when not required.

The spindle of each lamp is preferably provided with a spring 26 serving to hold a pin 27 on the spindle in yielding engagement with a notched collar 28 forming a part of the lower supporting bracket 13, so that the lamps are yieldingly locked in adjusted positions and particularly in the directly forward position, so as not to be disturbed by the vibration of the car when arranged for use in the ordinary way. Pressure in either direction upon the pedal 20, however, will disengage the locking means to permit of swinging movement of the lamps in one direction or the other to serve as above suggested as spot lights to throw the light upon the right side of the road so as to shield the driver of an approaching car from the glare thereof and thus act as a dimming means while serving as a guide to enable the operator of the car having the apparatus to avoid drawing too close for safety to the side of the road to which he is entitled.

Having described the invention, what is claimed as new and useful is:—

A dirigible headlight mechanism having headlights provided with spindles connected for simultaneous movement, means for rocking one of the spindles to vary the line of projection of the light rays from the headlights, collars provided with radial notches in their upper faces and rotatably supporting the spindles, compression springs in surrounding relation to the spindles below the collars, and diametrical pins inserted through the spindles above the collars and engaging notches in seats formed in the latter, whereby the lamps are retained in any angular position in which they may be disposed.

In testimony whereof he affixes his signature.

GEORGE L. HORTON.